Figure 1:
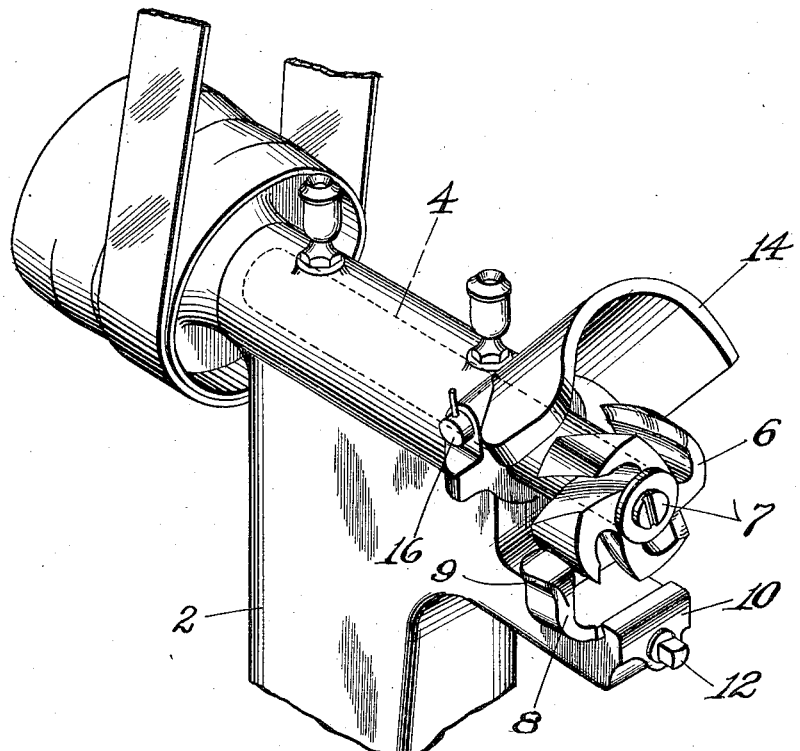

O. ASHTON.
TRIMMING MACHINE.
APPLICATION FILED AUG. 4, 1909.

1,030,375.

Patented June 25, 1912.

UNITED STATES PATENT OFFICE.

ORRELL ASHTON, OF LAWRENCE, MASSACHUSETTS, ASSIGNOR TO UNITED SHOE MACHINERY COMPANY, OF PATERSON, NEW JERSEY, A CORPORATION OF NEW JERSEY.

TRIMMING-MACHINE.

1,030,375.     Specification of Letters Patent.     Patented June 25, 1912.

Application filed August 4, 1909. Serial No. 511,111.

*To all whom it may concern:*

Be it known that I, ORRELL ASHTON, a citizen of the United States, residing at Lawrence, in the county of Essex and State of Massachusetts, have invented certain Improvements in Trimming-Machines, of which the following description, in connection with the accompanying drawings, is a specification, like reference characters on the drawings indicating like parts in the several figures.

This invention relates to trimming machines and particularly to trimming machines of the type used in the manufacture of boots and shoes for trimming off the surplus edge portions of the vamp and lining of a lasted shoe.

In manufacturing boots and shoes, and particularly in welted work, it is necessary to trim off the projecting edges of the upper and lining, especially around the toe portion of a shoe, after the shoe has been lasted and prior to the sewing operation, in order to prevent these edges from interfering with the operation of certain parts of the sewing mechanism.

The present invention aims to provide a trimming machine especially adapted for this purpose which shall be strong and durable, efficient in operation, cheap to manufacture and in which the parts subject to greatest wear may be quickly and cheaply renewed. A machine in which these advantages are obtained and which forms a preferred embodiment of the invention is illustrated in the accompanying drawings, in which,—

Figure 2:
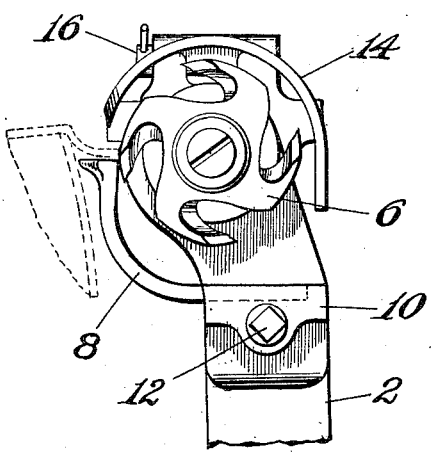

Figure 1 is a perspective view of the trimming machine, and Fig. 2 is an end elevation of the same.

Referring to the drawings, 2 designates a frame supporting at its upper end in suitable bearings a shaft 4 which may be rotated by the belt and pulley drive shown. Rigidly mounted on the forward end of the shaft is a cutter 6 held in place by a screw 7 and having a plurality of blades, the cutting edges of the blades preferably being arranged in a cylindrical surface the axis of which coincides with the axis of the shaft 4. Coöperating with the cutter blades is a stationary shearing blade 8 mounted in a dovetailed guideway formed partly in the frame 2 and partly in a clamping block 10. By this arrangement the shearing blade may be adjusted in a plane transverse to the axis of the shaft 4 to take up wear; and the blade may be locked in an adjusted position by means of a clamping bolt 12 extending through the block 10 into the frame. The shearing edge of the blade 8 is preferably arranged substantially parallel with the axis of the shaft and the cutting edges of the rotating blades form an oblique angle with said shearing edge, so that as the blades are rotated past the member 8 they cut progressively through any material projecting beyond the active edge of the blade 8.

When the machine is in operation, it may be required to cut off tacks or the projecting ends of the toe binding wire; and in order that this severe service may not injure the blades, they are made comparatively heavy and are sharply beveled, as shown in the drawings. The cutter 6 and the shearing blade 8 are the only parts subject to any considerable wear, and they are arranged so that they may be readily removed to be repaired or replaced by others.

A hood or guard 14, preferably of segmental shape, is pivoted to the frame by a pin 16 extending transversely of the cutter shaft. This guard serves not only to protect the cutter from contact with foreign objects and to prevent trimmings being thrown into the face of the operator but also extending between the shoe and the body of the cutter as shown in Fig. 2, protects the shoe from all liability of being injured by the cutter if the shoe is carelessly handled.

The member which has been designated as the shearing blade 8 preferably has a special formation for the purpose of this invention. It has a plane wide top face of sufficient extent to hold the shoe away from the cutter and insure the retention of a suitable width of vamp and lining which it is desirable to keep until after the inseam sewing operation; and it positions the shoe bottom far enough away from the path of the cutter 6 so that properly placed lasting tacks or portions of the toe binding wire will not interfere with the presentation and feed of the shoe and will not be disturbed or caused to loosen the upper which they are intended to hold in lasted position until after the inseam sewing operation. This is an important consideration in a machine for effecting the preliminary trimming for which this machine is intended. The top or work supporting face of the shearing blade is tapered in the direction opposite to that in which the work is fed to adapt it to find easy entrance under the vamp and lining and to straighten out into position to be trimmed portions of the vamp and more particularly of the lining which may have been bent down upon the shoe bottom or crumpled or folded so that otherwise they would not be evenly cut away and might obstruct the sewing mechanism. These trimming devices leave the vamp lining standing up at right angles to the plane of the shoe bottom on both sides of the line of the inseam, so that the shoe is prepared excellently for the inseaming operation. The shearing blade 8 also has on its outer face a protruding lip 9 about which the shoe can be rocked by the operator to trim more or less closely on different shoes or on different portions of the same shoe as conditions may require.

Having described my invention, what I claim as new and desire to secure by Letters Patent of the United States is:—

1. A machine of the class described, comprising in combination, a rotary cutter having a plurality of blades, the cutting edges of said blades being arranged in a cylindrical surface, the axis of which coincides with the axis of said cutter, and a stationary shearing blade coöperating with the blades of said cutter.

2. A machine of the class described, comprising in combination, a rotary cutter having a plurality of blades, the cutting edges of said blades being arranged in a cylindrical surface, the axis of which coincides with the axis of said cutter, and a stationary shearing blade coöperating with said cutter, the cutting edge of each of said rotary blades when positioned adjacent to said stationary blade being arranged to form an oblique angle with the shearing edge of said stationary blade.

3. In a trimming machine, the combination with a rotary cutter of a stationary shearing blade coöperating with said cutter, said blade having a protruding lip to engage the insole of a shoe being trimmed and constructed and arranged to permit the shoe to be rocked thereon into position to cause the vamp and lining to be trimmed more or less closely to the insole and having a work engaging face tapered in the direction opposite to that in which the work is fed.

4. A machine of the class described, comprising in combination, a rotary cutter having a plurality of blades, the cutting edges of said blades being arranged in a cylindrical surface, the axis of which coincides with the axis of said cutter, an adjustable shearing blade coöperating with said cutter, and a pivoted guard for said cutter having a portion extending between the cutter and the body of the shoe being trimmed.

5. A machine of the class described, comprising in combination, a frame, a shaft supported thereby, means for rotating said shaft, a cutter rigidly mounted on said shaft, a stationary shearing blade supported by said frame and coöperating with said cutter, and means whereby said blade may be adjusted in a horizontal plane in a direction transverse to the axis of said shaft.

In testimony whereof I have signed my name to this specification in the presence of two subscribing witnesses.

ORRELL ASHTON.

Witnesses:
 JOHN A. McCREADY,
 ARTHUR L. RUSSELL.